United States Patent [19]

McNamara

[11] Patent Number: 4,569,049

[45] Date of Patent: Feb. 4, 1986

[54] DIAGNOSTIC SYSTEM FOR A DIGITAL COMPUTER

[75] Inventor: Robert S. McNamara, Marlboro, Mass.

[73] Assignee: Digital Equipment Corp., Maynard, Mass.

[21] Appl. No.: 493,109

[22] Filed: May 9, 1983

[51] Int. Cl.$^4$ ............................................. G06F 11/00
[52] U.S. Cl. ........................................ 371/25; 371/16
[58] Field of Search ................. 371/67, 25, 21, 3, 15, 371/16, 71; 364/200, 900

[56] References Cited

U.S. PATENT DOCUMENTS

| | | | |
|---|---|---|---|
| 3,222,651 | 12/1965 | Fabiszewski et al. | 371/67 |
| 3,787,815 | 1/1974 | Farr | 371/67 |
| 4,223,382 | 9/1980 | Thorsrub | 371/3 |
| 4,327,408 | 4/1982 | Frissell et al. | 371/3 |
| 4,408,200 | 10/1983 | Bradley | 371/67 |

Primary Examiner—Michael R. Fleming
Attorney, Agent, or Firm—Cesari and McKenna

[57] ABSTRACT

A central processor unit sends known simulated data signals to the video display subsystem and disk storage subsystem of a computer system; the simulated data is processed by the subsystems as if it were real data and is then returned to the processor. The processed signals or their error detecting codes are compared with the corresponding information expected to be returned and an error is signalled if the returned signals differ from those expected. During the diagnostic routine, the video display is blanked and the video character generator is slowed down. In response to a known sequence of character information supplied thereto, the character generator supplies a corresponding slowed-down stream of bits representing the resulting video; this stream of bits is fed to a slow speed serial port and then to the processor, where an error detecting code is generated from the bit stream and compared to an error detecting code provided by the character generator in response to the input thereto. Similarly, a known data sequence is provided to the disk subsystem where it is treated as if it were data read from the read/write head of the disk drive; for this purpose, the sequence is reversed in order prior to being processed as simulated read data.

5 Claims, 3 Drawing Figures

DIAGNOSTIC SYSTEM FOR A DIGITAL COMPUTER

FIELD OF THE INVENTION

This invention relates to the field of digital data processing systems and, more particularly, to a diagnostic system for testing the operability of video output and secondary storage facilities therefor.

BACKGROUND OF THE INVENTION

In digital data processing systems, reliability of performance is a paramount consideration. The prior art is replete with efforts to insure and enhance reliability. Some of these techniques, though useful, are costly to implement, or are suitable only for systems of particular types. In recent times, with the advent of microcomputers, which provide the basis for low cost personal computer systems, a need has developed for inexpensive diagnostic techniques. Typically, microcomputer systems used in so-called "personal computers" employ video displays for providing output and disk storage devices (particularly so-called "floppy" disk storage devices) for providing mass-memory.

It is therefore an object of the present invention to provide an inexpensive diagnostic system for testing the operability of video output and secondary storage facilities for data processing systems, such as microcomputer systems.

SUMMARY OF THE INVENTION

In accordance with this invention, the foregoing objects are achieved by means of a diagnostic system which employs the central processor unit of the data processing system to send known simulated data signals to a video display subsystem and to a disk storage subsystem; those subsystems process the simulated data signals and return the processed signals to the processor. The processed signals are compared with the known signals which should be returned; the processor signals an error if the returned signals differ from those expected.

A video subsystem of such a microcomputer system comprises a display refresh memory, a character generator, control circuitry, and a video display device, usually a cathode ray tube unit (CRT). At any given time during operation of the system, the display refresh memory contains, in coded form, all of the display characters being displayed on the CRT screen. The codes of the characters are retrieved from the memory one by one and applied to the character generator, which contains the dot matrix patterns of the set of display characters. The character generator responds with a series of bits that turn the CRT beam on and off as it sweeps across the screen, so as to depict the dots in successive characters. A line of characters displayed on the screen comprises a series of CRT horizontal sweeps or scan lines. Thus, the codes of the characters in a display line are applied to the character generator several times, so that the character generator can respond with the video signals for dots in the successive scan lines making up the display line.

To be more specific, the video signals applied to the display unit for the display of a line of characters comprise first the signals for displaying the first scan line of all the characters, followed by the signals for the second scan line, and so forth. Thus, the video signals for each character are interleaved with those of the other characters on the same display line.

For the diagnostic routine, the refresh memory is loaded with the codes of a character string including the complete set of display characters; it is also loaded with the code for a character that is not displayable and thus is not loaded into the display memory during normal usage. For example, this code may be the conventional code for a delete "character". The character generator is configured to respond to this non-display character with a series of bits representing the cyclic redundancy check (CRC) code for the bits emitted by the generator in response to the string of display characters used in the diagnostic routine.

During the diagnostic routine, the video signals emitted by the character generator are not displayed; the display is intentionally blank. Instead, the control circuitry slows the character generator down from its normal output rate of about 24 MHz to a slower bit rate, about 250 kHz; and this slowed-down replica of video output from the character generator is fed as a stream of bits (scan line by scan line) to a slow speed serial communications port and then to the central processor.

The processor generates the CRC code in response to the stream of bits from the character generator and it compares this generated code with the CRC code received from the character generator to determine whether the elements involved in this loop-back arrangement are operating properly. Specifically, if the CRC code calculated by the central processor in response to the stream of bits representing the display characters is not the same as the CRC code "character" emitted by the character generator, there is a malfunction to be corrected.

A secondary storage subsystem for such a microcomputer system also generally comprises a disk storage device and a control unit therefor. According to a second aspect of the invention, certain predetermined data is stored in a portion of a primary memory unit of the data processing system for use in diagnosing the operation of the secondary storage subsystem. This data, which simulates an MFM-encoded recording of known information, is transmitted by the central processor to the control unit for the secondary storage system, and is looped back through the controller for data separation and decoding; it is then returned to the central processor, to simulate data read from the disk drive. The signal coming back from the control unit to the central processor is compared by the central processor with other stored data which is the unencoded form of the MFM-encoded data provided to the controller, to insure that the control unit has properly processed signals for reading from the disk drive.

Additional objects, features and advantages will become more readily apparent from the following detailed description, which should be read in conjunction with the accompanying drawing.

DESCRIPTION OF AN ILLUSTRATIVE EMBODIMENT

Figure 1:
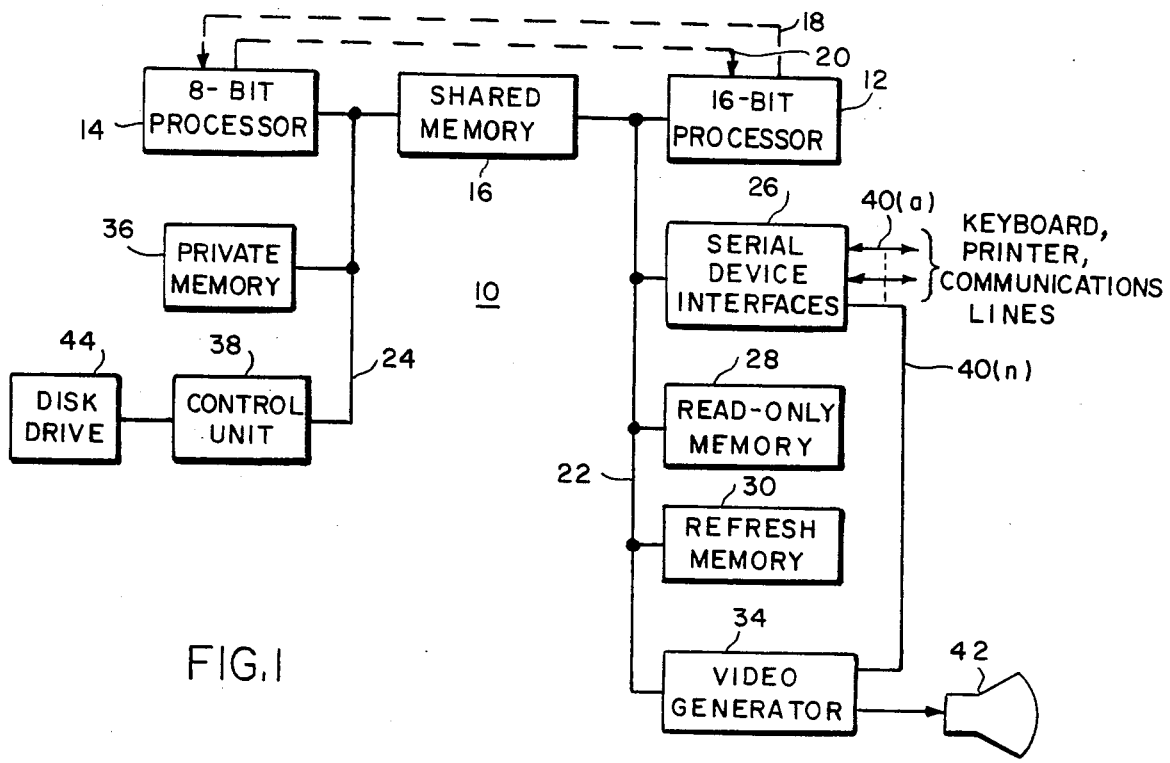
FIG. 1 is a hardware block diagram of a data processing system in which the present invention is applicable.

The present invention pertains to a digital computer system such as is illustrated in FIG. 1 in block diagram form. The computer 10 includes a first, 16-bit processor 12 and a second, 8-bit processor 14. Processors 12 and 14 can communicate with each other through a shared main memory 16. Also, the processors can interrupt each other, with direct signals as indicated symbolically by the dashed lines 18 and 20. Processor 12 may, for example, be a type 8088 microprocessor from Intel Corporation of Santa Clara, Calif., and processor 14 may, for example, be a type Z80 microprocessor of Zilog Corporation of Cupertino, Calif. Each of the processors 12 and 14 employs a bus (22 and 24 respectively) for communicating with other elements of the system. The first bus 22 interconnects the microprocessor 12, shared memory 16, serial device interface 26, read-only memory (ROM) 28, refresh memory 30, and a video generator 34 which provides video signals for display on a video display device 42. Correspondingly, the second bus 24 interconnects microprocessor 14, shared memory 16, a private memory 36 and a disk control unit 38.

Briefly, the purpose and function of each of these elements is as follows. Serial device interface 26 converts the parallel signals on bus 22 into bit-serial signals for communications over lines 40(a)–40(n) to serial devices such as a keyboard, printer, and communications link; it also translates the serial signals from such sources to parallel signals to be placed onto bus 22. ROM 28 provides storage for diagnostic programs for processor 12. Refresh memory 30 stores the codes of characters to be displayed by a video display device 42. The refresh memory 30 contains a storage location for each of the possible character positions on the video display device 42; it may also contain locations for indicating the attribute or attributes of each character, such as whether the character should be blinking or underlined.

The video generator 34 supplies proper timing and control signals for operation of the display 42 and, further, converts the information stored in the refresh memory 30 into a stream of bits to display (i.e., turn on) appropriate pixels (i.e., dots) on the screen of display device 42. Private memory 36 provides local program storage for processor 14. Disk control unit 38 provides an interface to the disk drive 44.

Figure 2:
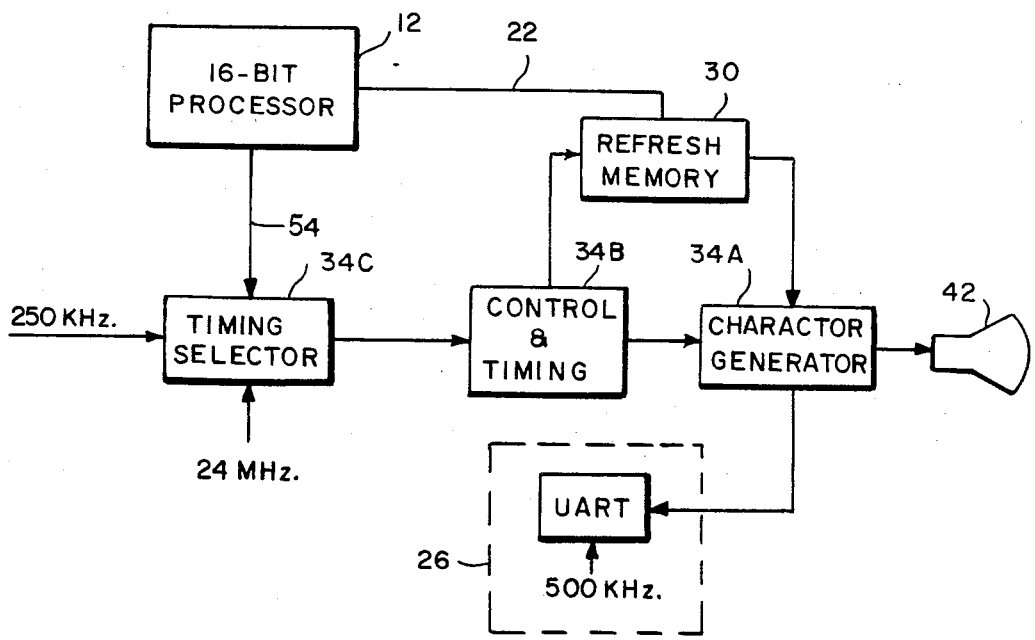
FIG. 2 is a functional diagram for a portion of the system of FIG. 1, illustrating a first aspect of the invention, the testing of the video subsystem.

In FIG. 2, there is shown an alternative block diagram which illustrates in more functional terms the operation of the apparatus of FIG. 1 in accordance with the first aspect of the present invention concerning diagnosis of the video output system. In FIG. 2 the video generator 34 of FIG. 1 has been broken down into three constituent elements: a character generator 34A, control and timing circuitry 34B and timing selector 34C. The timing selector 34C, may in fact, be subsumed within processor 12; however, for clarity of explanation, it is shown as a separate element. Similarly, other functional elements may be subsumed in the processor 12.

The character generator 34A contains the dot matrix representations of all the characters that can be displayed on the display device 42. Conventionally, it receives the codes of the characters from the refresh memory 30 in the sequence in which they are displayed and it receives from the control and timing circuitry 34B the numbers of the successive video scan lines required to display each line of characters. Thus, the codes of the characters in the first display line are applied in succession to the generator 34A, along with the number of the first scan line and, under control of the control and timing circuitry 34B, the generator 34A responds with the video signals representing the string of dots displayed across the CRT screen in the first scan line. This process is repeated, scan line-by-scan line until all the dots in the first line of characters have been displayed. The next line of characters is then displayed in the same manner.

The character generator 34A also contains the CRC code corresponding to the stream of bits emitted by it in response to its receiving the codes of preferably all the display characters in a predetermined sequence. It emits the CRC code in response to a character code that does not represent a display character. The CRC code from the generator 34A is in the form of a string of bits formatted in the same manner as the bits representing the display characters. Thus, the bits in the CRC code are emitted in groups in a succession of scan lines, these groups being interleaved with the groups of bits in the corresponding scan lines of display characters.

Timing by the control and timing circuitry 34B is controlled by a timing selector 34C, which selects one of two basic clock rates. A mode control signal supplied by processor 12 on line 54 determines which clock rate appears at the output of timing selector 34C. When the mode signal is provided in a first state, the clock from timing selector 34C runs at a fast rate and the circuitry 34B provides timing signals at standard rates for video display; in a second (diagnostic) mode signal state, the clock from timing selector 34C runs at a slower rate and the circuitry 34B provides timing signals at a rate substantially slower than standard video rates. For example, the faster clock may yield a 24 MHz video output from the character generator 34A while the slower clock yields a 250 kHz "video" output.

In the diagnostic mode, processor 12 issues the slow speed mode signal on line 54. Responsive to the mode signal the control and timing circuitry 34B blanks the video display 42 and provides the "slow" bit-serial video signal. This signal, in turn, is sampled and converted to parallel words by serial interface 26. These parallel words are provided from interface 26 to memory 16 via bus 22. Processor 12, prior to or simultaneously with providing the diagnostic mode signal on line 54, also wrote or writes to refresh memory 30 a predetermined character pattern. This character pattern comprises the predetermined sequence of display characters, so as to exercise all or nearly all the operational elements of character generator 34A. The sequence also includes the character code that causes the generator 34A to emit the CRC code.

After the sampled bit stream has been loaded into the shared memory 16, it is processed by the processor 12. In response to a suitable sequence of instructions, the processor strips out the CRC code from the stored bit stream and replaces it by zeros. The processor then calculates the CRC code for the resulting stored bit stream and compares it with the CRC code recovered from the bit stream. Identity of the two CRC codes indicates proper functioning of the various units involved in the procedure, e.g. the refresh memory 30, video generator 34 and bus 22.

In an exemplary system incorporating the invention, the video output signal is sampled at twice the latter rate, i.e. 500 kHz, synchronized with the 250 kHz clock. This permits sampling of the video signal without regard to which edges of the 250 KHz clock signal are used by the control and timing unit 34B. The processor also accounts for other modifications of the bit stream such as dot-stretching, which may have been made by the video generator 34 to enhance the displayed image.

If a new character generator 34A is inserted into the system to display a different set of characters, it is provided with the CRC code for the display of those characters, this code being emitted by the generator 34A in response to the same non-display-character code as before. The diagnostic routine can therefore perform, without modification, with the new character generator. The routine can therefore be stored in the read only memory 28.

It will be understood that, for purposes of clarity, numerous obvious details of circuit design have been omitted from the foregoing description. The detailed design of character generators, video timing generators, video blanking circuits and so forth is well within the ability of those skilled in the art and would serve only to obscure the invention. Moreover it will be understood that the diagnostic arrangement is also applicable to systems that employ a bit-mapped refresh memory containing the dot matrix representations of the characters to be displayed.

Figure 3:
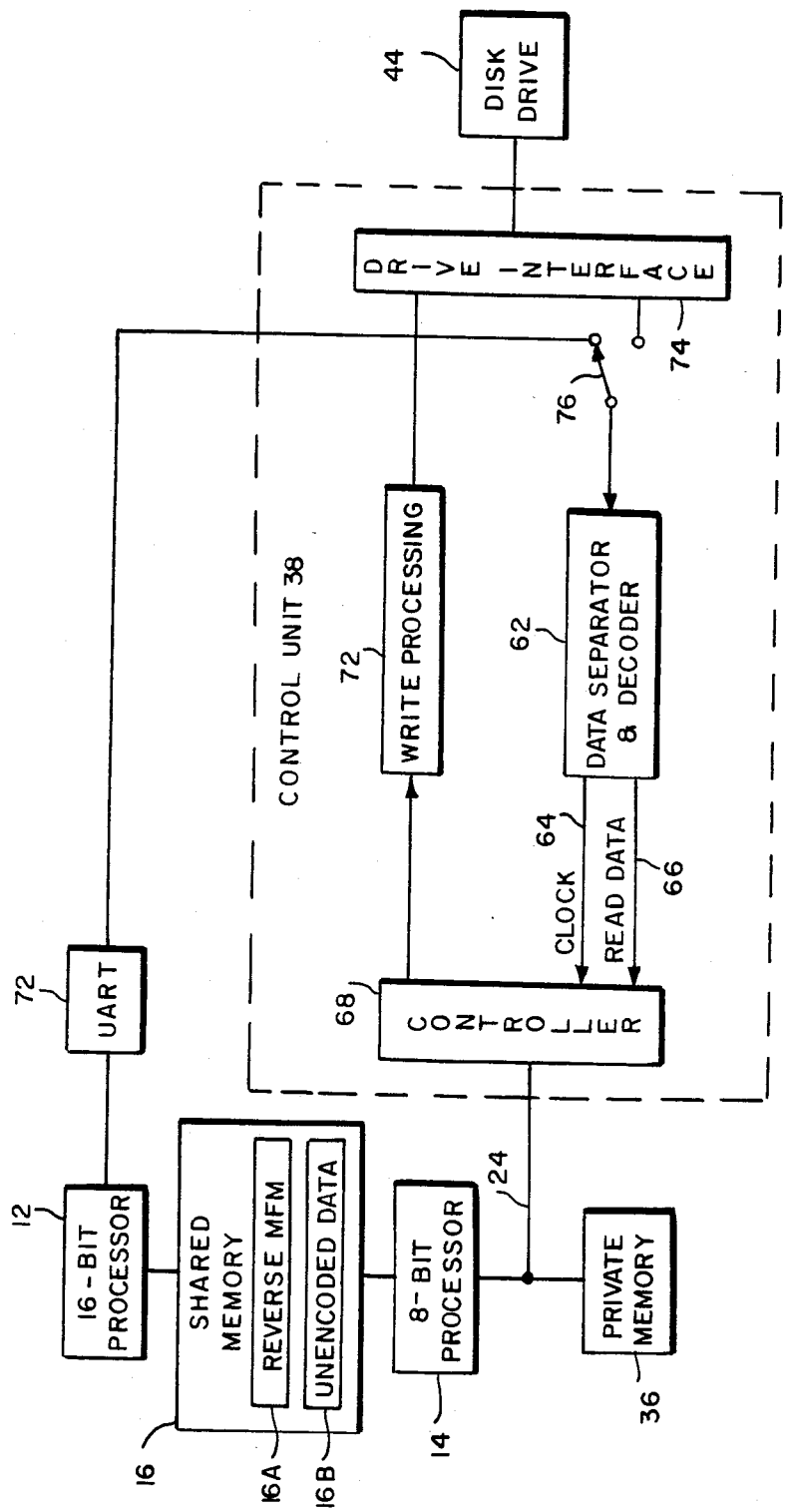
FIG. 3 is a functional diagram for a portion of the system of FIG. 1, illustrating a second aspect of the invention, the testing of the secondary storage subsystem.

For explaining further the operation of the second aspect of this invention, the block diagram of FIG. 1 has been redrawn in FIG. 3, to show the internal structure of control unit 38. Processor 12, acting through memory 16, initiates the diagnostic mode for the secondary storage unit comprising control unit 38 and floppy disk drive 44. The actual diagnostic routine operates under control of processor 14, though.

The purpose of the diagnostic mode is to check out the operation of various elements in the control unit 38, such as the data separator and decoder 62 and other read channel circuitry (e.g. a single-chip disk controller 68 containing such elements as status and control registers, track counting circuitry and serial/parallel conversion circuits).

Ordinarily, data written onto the recording medium of floppy disk drive 44 is encoded in so-called MFM (i.e., modified frequency modulation, also called double-frequency) format. In MFM format, a clock signal is embedded with the data. Control unit 38 thus includes a data separator and decoder 62 which separates the clock signal from the recorded data to obtain a stream of data bits representing recorded data.

The controller 68 decodes the encoded MFM data and also strips out from the data stream certain "overhead" information usually recorded at the beginning of each disk section, such information including a preamble, an address mark and a header. The clock output of data separator and decoder 62 is provided on line 64 and the decoded read data is provided on line 66; both are supplied to the controller 68, which passes the data to processor 14 via bus 24. For writing to the disk drive, data signals from bus 24 are processed by write processing circuitry 72 which appropriately conditions the already encoded signals. The encoded signals are then supplied to the disk drive 44 via an interface 74, which includes appropriate line drivers and receivers.

Data is written onto and read from disk 44 in bit-serial form, whereas data is transmitted over bus 24 in parallel form. Controller 68 includes a universal asynchronous receiver/transmitter (UART) which performs the necessary serial-to-parallel and parallel-to-serial conversions.

One of the aspects of the present invention is to provide a test pattern to the control unit 38 to verify the operation of data separator and decoder 62 and parts of the controller 68. For this purpose, a switch or multiplexer 76 is provided. With switch 76 in the position indicated in FIG. 3, data from sixteen-bit processor 12 is supplied via bus 24, after parallel-to-serial conversion by a UART 72, directly to the input of data separator and decoder 62, simulating data supplied by the floppy disk drive 44.

Typically, however a UART such as UART 72, when converting from a parallel input signal to a serial output signal supplies a serial word of data with the bits thereof arranged in ascending order of significance—i.e., with the least significant bit first and the most significant bit last. On the other hand, by convention, the serial output of most floppy disk drives is provided with the most significant bit first. Accommodation to the difference between these two bit sequences is accomplished in the manner indicated below.

In a preassigned dedicated area in main memory 16, there is written the test signal 16A which is to be looped through the control unit 38. Test signal 16A is written as if raw data 16B had been encoded in MFM format and then each byte thereof were bit-wise reversed in order—i.e., with the most-significant bit (MSB) becoming the least-significant bit, and so forth. This "simulated MFM" signal is then fed, bit by bit from UART 72 to the input of data separator and decoder 62. From the output of data separator and decoder 62, the "decoded" "Read Data" signal is supplied on line 66 to controller 68 and thence over bus 24 to processor 14 and on to memory 16.

Processor 12 compares the raw, unencoded data 16B with the recovered data read back from data separator and decoder 62. If the original data 16B and the recovered data match, then bus interface 68 and data separator and decoder 62 have operated correctly, and processor 12 signals successful completion of the diagnostic routine. Otherwise, an indication is provided of an error condition.

Switch 76 is changed to its alternate state for normal operation of disk drive 44.

Having thus described an embodiment of the invention, it will be apparent that various alterations, modifications and improvements will readily occur to those skilled in the art. It is intended that such alterations, modifications and improvements be and are within the scope of this invention. Thus, the foregoing description is illustrative only, and should not be considered limiting on the scope of protection; rather the invention is limited only according to the claims appended below, and equivalents thereto.

What is claimed as new and desired to be secured by Letters Patent of the United States is:

1. A diagnostic system for a digital data processing system which includes a video display device, control and timing circuitry for controlling the operation of the display device, a refresh memory for storing a representation of a sequence of data elements to be displayed, a processor for supplying to the refresh memory representations of data to be displayed, means for generating and supplying to the display device, responsive to stored data element representations from the refresh memory, video signal representations of the data elements, and diagnostic means for diagnosing errors in various elements of the data processing system, the diagnostic means comprising:

(a) means for supplying a mode control signal in a first state to initiate diagnostic operation and in a second state during non-diagnostic operation;

(b) means for providing a basic clock signal at a first rate responsive to the mode control signal being provided in the first state and at a second rate responsive to the mode control signal being provided in the second state;

(c) the control and timing circuitry providing a set of timing signals responsive to the basic clock signal;

(d) means for loading into the refresh memory in response to the mode control signal being supplied in the first state, a representation of a predetermined sequence of display data elements and of an expected error detecting code corresponding to the video signal representation of the predetermined sequence of display data elements, the representation of the error detecting code being in the same format as the representations of the display data elements:

(e) the means for generating video signal representations being adapted to respond to the data element representations in the refrsh memory by supplying, when the mode control signal is in the first state, video signal representations of the predetermined sequence of display data elements and the actual error detecting code corresponding thereto, at a rate substantially slower than the video rate when the mode control signal is in the second state; and (f) means for calculating the expected error detecting code for the video signal representations of the display data elements and for comparing the expected error detecting code with an actual error detecting code provided by the generating means and for indicating an error if the expected error detecting code and the acutal error detecting code differ.

2. The system of claim 1 further including:

(g) low speed device interface means cooperating with the processor for receiving input signals from a low speed bit-serial device;

(h) the set of timing signals being provided
 (i) at a first set of rates responsive to the basic clock signal being provided at the first rate, and
 (ii) at a second set of rates responsive to the basic clock signal being provided at the second rate, the set of timing signals at the second set of rates including timing signals for operating the display device to display normal video and the set of timing signals at the first set of rates being a substantially slower counter to the set of timing signals at the second set of rates; and (i) the video signal representations being provided by the control and timing circuitry, acting as a low speed bit-serial device, as input signals to the low speed device interface means when the mode control signal is provided in the first state.

3. A diagnostic system for diagnosing errors in a digital computer which includes a secondary storage device, a control unit for controlling the operation of the secondary storage device, a first processor for supplying to the secondary storage device information to be stored and for receiving from the secondary storage device information stored therein, a second processor, bus means for interconnecting the first processor and the control unit, the control unit thereby communicating between the bus means and the secondary storage device, the secondary storage device being adapted to record information bit-serially by the byte, in a predefined first sequence, said system comprising:

(a) a memory having first and second sets of memory locations;

(b) the control unit including decoding means for converting signals from a first digital format to a second digital format;

(c) coupling means responsive to a diagnostic mode control signal from the second processor for supplying to the decoding means from said memory a set of data bits;

(d) means for recording in the first set of memory locations a first sequence of data bits;

(e) means for recording in the second set of memory locations a second set of data bits, the second set of data bits representing the values of the first set of data bits as they would be recorded in the secondary storage device but recorded in the opposite order of bit significant, whereby said coupling means provides said second set of data bits to said decoding means in the same order of bit significant as used for said first sequence; and (f) means for comparing an output signal sequence from the control unit, provided in response to signals supplied to the decoding means by the coupling means, with the first sequence of data bits and for signalling an error if the data value of the output signal sequence differs from the data value of the first sequence data bits.

4. A diagnostic system for diagnosing errors in various elements of a data processing system which includes a video display device, control and timing circuitry for controlling the operation of the display device, a refresh memory for storing a representation of a sequence of data elements to be displayed, a processor for supplying to the refresh memory representations of data to be displayed, video generating means for generating and supplying to the display device, responsive to stored data element representations from the refresh memory, video signal representations of the data elements, the diagnostic system comprising:

(a) means for supplying a mode control signal in a first state to initiate diagnostic operation and in a second state during non-diagnostic operation;

(b) means for loading into the refresh memory in response to the mode control signal being supplied in the first state, a representation of a predetermined sequence of displayable characters and at least one non-displayable character;

(c) the video generating means for generating video signal representations being adapted to respond to the character representations in the refresh memory by supplying, when said non-displayable character is present, video signal representations of the predetermined sequence of characters and an actual error detecting code corresponding thereto, at a rate substantially slower than the video rate when the mode control signal is in the second state; and (d) means for calculating an expected error detecting code for the video signal representations of the characters and for comparing the expected error detecting code with the actual error detecting code provided by the video generating means and for indicating an error if the expected error detecting code and the actual error detecting code differ.

5. The system of claim 4, further including:

(e) means for providing a basic clock signal at a first rate responsive to the mode control signal being provided in the first state and at a second rate responsive to the mode control signal being provided in the second state;

(f) the control and timing circuitry providing a set of timing signals responsive to the basic clock signal;

(g) low speed device interface means cooperating with the processor for receiving input signals from a low speed bit-serial device;

(h) the set of timing signals being provided (i) at a first set of rates responsive to the basic clock signal being provided at the first rate, and (ii) at a second set of rates responsive to the basic clock signal being provided at the second rate, the set of timing signals at the second set of rates including timing signals for operating the display device to display normal video and the set of timing signals at the first set of rates being a substantially slower counterpart to the set of timing signals at the second set of rates; and (i) the video signal representations being provided by the control and timing circuitry, acting as a low speed bit-serial device, as input signals to the low speed device interface means when the mode control signal is provided in the first state.

* * * * *